Patented Feb. 24, 1942

2,273,872

UNITED STATES PATENT OFFICE 2,273,872

DOUBLE SILICATES OF ZIRCONIUM AND METHOD OF MAKING SAME

Charles J. Kinzie, Niagara Falls, N. Y., assignor to The Titanium Alloy Manufacturing Company, New York, N. Y., a corporation of Maine No Drawing. Application December 29, 1937, Serial No. 182,243

14 Claims. (Cl. 106—312)

This application is a continuation in part of my pending application for Patent filed June 12, 1934, Serial No. 730,265, now U. S. Letters Patent No. 2,127,844 of August 23, 1938.

My invention relates more particularly to improved methods of making calcium silicate zirconia complexes that I have found to be of great advantage in the manufacture of enamels and glazes, in which such improved calcium silicate zirconia complexes are used as opacifiers, as well as in the manufacture of paints and lacquers in which such novel calcium silicate zirconia complexes are employed as pigments.

Zircon ($ZrSiO_4$) has useful properties as a constituent of protective coatings, such as vitreous enamels as well as paint and lacquer coatings made with organic vehicles. I have found, however, that $ZrSiO_4$ is rather difficult to reduce to such a degree of fineness as required for pigment purposes, especially for those applications in which the vehicle and pigment are ground together in an iron mill, in which case any residual gritty abrasive particles in the zircon will be likely to wear off enough iron to discolor the paint or other coating.

It is also true that zircon is of a very refractory nature as regards heat and response to chemical action, which tends in ceramics to retard the reactions necessary in order that the zirconium may have its desired effect in combination with other materials employed in forming the ceramic coatings.

I have discovered that by first converting the zircon ($ZrSiO_4$) by heat in a dry way to a double silicate, the compounds formed are free of the objectionable abrasive properties inherent in zircon, and also that the double silicates so formed are less refractory as compared with the $ZrSiO_4$ and then combined more readily with other ceramic materials to produce the desired effects.

The alkaline earth carbonates, such as $BaCO_3$, $CaCO_3$, $MgCO_3$, $SrCO_3$, have the objectionable feature in ceramics of evolving volumes of $CO_2$ incidental to firing operation in glazes, etc. By combining these compounds with zirconium as alkaline earth zirconates, and particularly alkaline earth zirconium silicate, products are formed which may be added at the mill, and by this means the useful properties of the alkaline earth fluxes are obtained along with the strength imparting, opacifying and color stabilizing effects of zirconium, all combined in one product without the harmful evolution of gases during the firing operation.

Alkali-metal carbonates represent the usual source of sodium, potassium, lithium, etc. for ceramics, but in either enamels or glazes these compounds are water-soluble and must first be combined with certain of the other constituents to form a relatively less soluble compound or glass which may then be used as the source of the alkali-metal compound.

By dry-reacting alkali-metal compounds with zirconium to form an alkali-metal zirconate and especially an alkali-metal zirconium silicate, the useful effects of the alkali-metal and the zirconium are obtained in a water-insoluble compound addition at the mill without resort to the usual fritting or partial fritting operation.

These compounds, particularly the double silicates mentioned form useful cements as for example, temperature cements which are less refractory than $ZrSiO_4$ and will upon heating sinter or fuse to bind the bricks, etc. between which the cement is placed; the various combinations of zirconium and silicon with alkaline earths and alkali metals form a temperature cement range from about 700° C. up to about 2000° C.

Another feature of this cement phase which has useful applications is that based on the quick setting of the double silicate compounds by reaction with acid, for instance, by wetting with phosphoric or sulphuric acid which upon drying tends to react and set the cement into a hard bonding mass.

The novel calcium silicate zirconia complexes are relatively free of the gritty properties of zircon, while at the same time they are crystalline in structure so as to form useful polishing agents. Hence the various altered zircons or calcium silicate zirconia complexes present a wide range of properties for the polishing field.

Some of these compounds, particularly the calcium silicate zirconia complexes, should prove of use as cosmetic pigments as these are non-toxic, relatively inert and soft products of good pigmenting value.

My invention consists chiefly in the discovery that by solid phase thermal reaction between zircon or zirconium silicate ($ZrSiO_4$) and calcium carbonate, both in a fine state of subdivision and in close physical contact during the heating, a complex is formed consisting of calcium silicate, in which is contained zirconium oxide, which complex when used as an opacifier in glazes, produces more opacity per unit weight of zirconium contained than is produced from the use of zirconium silicate.

The explanation of the greater opacity must reside in fact that the zirconium oxide particles are protected by the integrally formed high melting point, calcium silicate being thereby protected to a considerable extent from the solvent action of the more fusible glaze or enamel ingredients, and hence are permitted to remain as $ZrO_2$ so as to produce the full opacity advantages and benefits of this compound.

It is definitely indicated that whether added to enamel batches and smelted to form the frit or when added to enamel and glaze batches at the mill, this zirconia calcium silicate complex is a more effective opacifier than zircon ($ZrSiO_4$).

In addition my new and improved product evolves no gaseous products when the ware covered with enamels and glazes containing same is fired, while in comparison an enamel or glaze containing zirconia and calcium carbonate would, on firing, be affected by $CO_2$ evolved in decomposition of the $CaCO_3$ with resultant defective ware in many cases.

In practicing my invention, I prefer to start with practically pure zirconium silicate and a practically pure form of calcium carbonate. Some pure limestones are suitable. I aim to produce a pure material capable of imparting to enamels and glazes a high degree of whiteness. Obviously less pure materials may be used if requirements should at times be less exacting.

EXAMPLE A

*Batch weights*

| | Parts |
|---|---|
| $ZrSiO_4$ | 500 |
| Calcium carbonate in mole equivalent proportions | 273 | are milled to 325 mesh and finer, and are then heated to about 2250° F. to 2500° F. for a sufficient period of time to practically complete the decomposition of both the zircon and the $CaCO_3$ into a calcium zirconium silicate. At about 2250° F., the end product consists of zirconia crystals in a calcium silicate glassy matrix.

As the temperature is raised, the calcium silicate glass will crystallize to wollastonite ($CaSiO_3$), which crystallization in the end product may be almost complete at 2500° F., when the end products consists of $ZrO_2$ crystals, crystals of $CaSiO_3$ bonded with a small amount of glassy matrix.

In either event, a product is obtained which is reduced by suitable milling, preferably wet milling, in a porcelain-lined ball mill with porcelain balls, dried, and then the dried charge is disintegrated to form a powder having the following characteristics:

My novel product is composed of minute crystals of $ZrO_2$ dispersed in a glass having an index of refraction of 1.69 in case of reaction at 2250° F., while at 2500° F. the glassy matrix has in the main crystallized to wollastonite, having an index of refraction of about 1.63. The fact that the glassy matrix has a refractive index higher than that of wollastonite is no doubt due to the fact that a small amount of zirconium is in solution in the glass, thus raising the index of refraction. The product in bulk consists of a white powder.

Complexes having a lesser calcium content can be made by simply reducing the calcium carbonate in the mix and when reacted as described in Example A, there results complexes consisting of calcium silicate matrix in which is $ZrO_2$ and $ZrSiO_4$, the latter, of course, increasing in amount as $CaCO_3$ in the initial batch decreases.

EXAMPLE B.—*Basic calcium zirconium silicate*

*Batch weight*

| | Per cent |
|---|---|
| 500 parts by weight of $ZrSiO_4$ —325 mesh | 75 |
| 166 parts by weight of $CaCO_3$ | 25 |

A charge consisting of above ingredients is prepared as described in Example A. Prepared product is heated at about 2250° F. and milled as described in Example A.

Such basic calcium zirconium silicate so formed has approximately the following composition:

| | Per cent |
|---|---|
| CaO | 15.70 |
| $ZrO_2$ | 56.10 |
| $SiO_2$ | 28.20 |
| | 100.00 |

This product in the form of a basic calcium zirconium silicate is composed of a mixture of $CaSiO_3$, $ZrO_2$ and zircon crystals with a little glass matrix. The $CaSiO_3$ is a little off in index of refraction, and seems to contain some excess of $SiO_2$ in solution.

This product is of particular utility as a batch constituent in the manufacture of opaque frits and of equal or possibly more importance is its use in the preparation of opaque glazes for bricks, tile, terra cotta, pottery, white ware, etc.

In the foregoing examples the $ZrSiO_4$ has been a pure product containing but small amounts of impurities so that light-colored products may result. However, it would be entirely within the scope of my invention to use a $ZrSiO_4$ containing appreciable amounts of commingled impurities such as monazite, rutile, ilmenite, etc., provided the resultant discoloration will not be objectional for the uses intended.

I could use zirconium ores such as one containing about

| | Per cent |
|---|---|
| $ZrO_2$ | 50 |
| $ZrSiO_4$ | 40 |
| Impurities such as free silica, clay, $TiO_2$, $Fe_2O_3$ etc | 10 |

The double silicates and basic silicates may, of course, be made by intimately mixing and dry reacting of the separate oxides, $ZrO_2$, $SiO_2$ with the flux to yield similar products, but this is of only theoretical interest at $ZrSiO_4$ is much the lower priced material.

The zircon used was refined zircon containing approximately

| | Per cent |
|---|---|
| $ZrO_2$ | 65.00 |
| $SiO_2$ | 34.00 |
| $TiO_2$ | 0.10 |
| $Fe_2O_3$ | 0.10 |
| Others $Al_2O_3$ | 0.80 |
| | 100.00 |

In some instances it may be desirable to wash the milled product with water before drying to remove small amounts water-soluble salts.

I have found that the compounds of the metals which will effectively react with the zirconium silicate are the bi-valent oxides and carbonates of lead, zinc and the alkaline earth-metals. The amounts of these compounds of the metals used as reagents in the charge vary from that required to combine theoretically with the zircon to form the normal double silicate of zirconium with the metal used, down to amounts as shown in the "basic" example to form a complex consisting of the normal silicate, zirconium oxide and some residual zircon together with other substances that can not be identified with certainty. The resulting product as a basic double silicate consists of a mixture or complex and is not a definite chemical compound. The temperatures employed in these examples is sufficiently high to secure a substantially complete reaction of the ingredients of the charge in which the zircon is decomposed, but without fusion of such ingredients, and the products are in the form of finely-divided pigment particles.

I claim as my invention:

1. The method of making an opacifying calcium silicate zirconia crystalline complex which comprises heating an intimate mixture composed preponderatingly of finely-milled zirconium silicate and a lesser amount of calcium carbonate, both ingredients being of particle sizes finer than 44 microns, at temperatures below fusion but sufficiently high to secure a substantially complete reaction and decomposition in the solid phase of the zirconium silicate and calcium carbonate to form said opacifying complex containing zirconium oxide interspersed in a calcium silicate matrix.

2. The method of making an opacifying calcium silicate zirconia crystalline complex which comprises heating a charge of finely-milled zirconium silicate and calcium carbonate in mole equivalent proportion and intimately mixed, both ingredients being of particle sizes finer than 44 microns, at temperatures below fusion but sufficiently high to secure a substantially complete reaction and decomposition in the solid phase of the zirconium silicate and calcium carbonate to form said opacifying complex containing zirconium oxide interspersed in a calcium silicate matrix.

3. The method of making an opacifying calcium silicate zirconia crystalline complex which comprises heating an intimate mixture composed preponderatingly of finely-milled zirconium silicate and a lesser amount of calcium carbonate, both ingredients being of particle sizes finer than 44 microns, at temperatures between 2250° and 2500° F. to secure a substantially complete reaction and decomposition in the solid phase of the zirconium silicate and calcium carbonate to form said opacifying complex containing zirconium oxide interspersed in a calcium silicate matrix.

4. The method of making an opacifying calcium silicate zirconia crystalline complex which comprises heating a charge of finely-milled zirconium silicate and calcium carbonate in mole equivalent proportion and intimately mixed, both ingredients being of particle sizes finer than 44 microns, at temperatures between 2250° and 2500° F. to secure a substantially complete reaction and decomposition in the solid phase of the zirconium silicate and calcium carbonate to form said opacifying complex containing zirconium oxide interspersed in a calcium silicate matrix.

5. The method of making an opacifying calcium silicate zirconia crystalline complex which comprises heating an intimate mixture composed preponderatingly of finely-milled zirconium silicate and a lesser amount of calcium carbonate, both ingredients being of particle sizes finer than 44 microns, at temperatures below fusion but sufficiently high to secure a substantially complete reaction and decomposition in the solid phase of the zirconium silicate and calcium carbonate, and fine-milling the resulting mass to form said opacifying complex containing zirconium oxide interspersed in a calcium silicate matrix.

6. The method of making an opacifying calcium silicate zirconia crystalline complex which comprises heating an intimately mixed finely-milled charge composed of zirconium silicate and calcium carbonate in an amount less than in mole equivalent proportion, both ingredients being of particle sizes finer than 44 microns, at temperatures sufficient to secure a reaction of the ingredients of the charge in the solid phase, but without fusion, to form a complex consisting of a calcium silicate matrix containing zirconium oxide and zirconium silicate.

7. The method of making an opacifying calcium silicate zirconia crystalline complex which comprises heating an intimately mixed finely-milled charge composed of zirconium silicate and calcium carbonate in an amount less than in mole equivalent proportion, both ingredients being of particle sizes finer than 44 microns, at about 2250° F. to secure a reaction of the ingredients of the charge in the solid phase, but without fusion, to form a complex consisting of a calcium silicate matrix containing zirconium oxide and zirconium silicate.

8. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of calcium silicate crystals having dispersed therein crystalline zirconium oxide.

9. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of calcium silicate crystals having dispersed therein crystalline zirconium oxide and having an index of refraction between 1.63 and 1.69.

10. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of zirconium oxide interspersed in a calcium silicate matrix.

11. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of zirconium oxide interspersed in a calcium silicate matrix in mole equivalent proportion.

12. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of a matrix of calcium silicate containing zirconium oxide and zirconium silicate.

13. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of a matrix of calcium silicate containing zirconium oxide and a lesser amount of zirconium silicate.

14. As a new article, an opacifying calcium silicate zirconia complex obtained by the solid phase thermic reaction and decomposition of an intimate mixture of zirconium silicate and calcium carbonate, the ingredients thereof being in particle sizes finer than 44 microns at temperatures between 2250° and 2500° F. and characterized as being a white powder and consisting of calcium silicate in form ranging from a calcium silicate glass to crystals of $CaSiO_3$ and having interspersed therein crystalline zirconium oxide.

CHARLES J. KINZIE.